(12) United States Patent
Nakano et al.

(10) Patent No.: US 8,226,307 B2
(45) Date of Patent: Jul. 24, 2012

(54) IMAGING BODY AND IMAGING DEVICE HAVING THE SAME

(75) Inventors: Toshifumi Nakano, Sagamihara (JP); Tatsuya Suzuki, Setagaya-ku (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 185 days.

(21) Appl. No.: 12/850,125

(22) Filed: Aug. 4, 2010

(65) Prior Publication Data

US 2010/0309363 A1  Dec. 9, 2010

Related U.S. Application Data

(63) Continuation of application No. PCT/JP2009/050860, filed on Jan. 21, 2009.

(30) Foreign Application Priority Data

Feb. 14, 2008 (JP) ................................. 2008-033187
Feb. 14, 2008 (JP) ................................. 2008-033188

(51) Int. Cl.
*G03B 9/08* (2006.01)
(52) U.S. Cl. ...................................................... 396/452
(58) Field of Classification Search .................. 396/439, 396/452, 529, 535
See application file for complete search history.

(56) References Cited

U.S. PATENT DOCUMENTS

| | | | |
|---|---|---|---|
| 1,127,809 A | 2/1915 | Denk | |
| 1,633,373 A * | 6/1927 | Cregier | ............ 396/439 |
| 2,569,799 A | 10/1951 | Carroll et al. | |
| 2,596,799 A | 5/1952 | Tillyer et al. | |
| 3,914,034 A * | 10/1975 | Komine | ................ 352/142 |
| 4,730,199 A | 3/1988 | Ikemori et al. | |
| 4,854,679 A * | 8/1989 | Tsuji | .......................... 359/673 |
| 4,994,842 A | 2/1991 | Itoh et al. | |
| 5,208,624 A | 5/1993 | MacKay | |
| 5,319,405 A | 6/1994 | Ikemori | |
| 5,483,284 A | 1/1996 | Ishiguro | |
| 5,940,642 A | 8/1999 | Ishiguro | |
| 7,667,897 B2 | 2/2010 | Seo | |
| 7,787,193 B2 | 8/2010 | Sakamoto et al. | |
| 2007/0019098 A1 | 1/2007 | Senba et al. | |
| 2007/0230935 A1 | 10/2007 | Yahagi | |
| 2010/0283886 A1* | 11/2010 | Nakano et al. | ................ 348/341 |
| 2010/0284684 A1* | 11/2010 | Nakano et al. | ................ 396/439 |
| 2010/0309363 A1* | 12/2010 | Nakano et al. | ................ 348/340 |

FOREIGN PATENT DOCUMENTS

| | | |
|---|---|---|
| JP | 4-275534 A | 10/1992 |
| JP | 8-262564 A | 10/1996 |
| JP | 10-339907 A | 12/1998 |
| JP | 11-305315 A | 11/1999 |
| JP | 2000-013654 A | 1/2000 |
| JP | 2000-059655 A | 2/2000 |
| JP | 2000-333060 A | 11/2000 |
| JP | 2002-185845 A | 6/2002 |
| JP | 2007-019868 A | 1/2007 |

* cited by examiner

*Primary Examiner* — W. B. Perkey
(74) *Attorney, Agent, or Firm* — Dickstein Shapiro LLP

(57) ABSTRACT

An imaging body (1) includes: an attachment/detachment portion (2) to which an imaging optical system (12) is detachably attached; an imaging element (3); and a conversion optical system (4). The conversion optical system (4) is constituted by front side lens systems (4a, 4b) and a rear side lens system (4c). The conversion optical system (4) forms an intermediate image between the attachment/detachment portion (2) and imaging element (3). A shutter (5) is provided near the intermediate image.

4 Claims, 8 Drawing Sheets

IMAGING BODY AND IMAGING DEVICE HAVING THE SAME

BACKGROUND OF THE INVENTION AND RELATED ART

The present invention relates to an optical unit to which an imaging optical system is detachably attached, an imaging unit, an imaging body, and an imaging device.

There is known a camera capable of exchanging an imaging element with another imaging element of a different size according to the purpose (refer to Patent Document 1). This camera has a horizontally-long box-like camera body and a photographing lens for silver salt single-lens reflex camera. As the camera body, a camera body for silver salt single-lens reflex camera is used without modification. As a back lid, one for silver-salt camera and one for digital camera are prepared. When the back lid for digital camera is attached to the camera body, this camera can be used as a digital camera. Further, this camera has a configuration allowing exchange of a CCD substrate and thus different types of digital cameras can be realized by one camera body.

Patent Document 1: JP-A-2000-59655

SUMMARY OF THE INVENTION

An imaging body according to a first aspect of the present invention includes: an attachment/detachment portion to which an imaging optical system is detachably attached; an imaging element; and an conversion optical system, wherein the conversion optical system is constituted by a front side lens system and a rear side lens system, the conversion optical system forms an intermediate image between the attachment/detachment portion and the imaging element, and a shutter is provided near the intermediate image.

The shutter is disposed between the attachment/detachment portion and the intermediate image.

The shutter is disposed between the intermediate image and the imaging element.

An imaging device according to the present invention includes the imaging body of the first aspect of the present invention and the imaging optical system.

An imaging body according to a second aspect of the present invention includes: an attachment/detachment portion to which an optical unit is detachably attached; an imaging element; a conversion optical system; and a finder optical system, wherein the conversion optical system is designed to form an intermediate image, the finder optical system has an optical path folding member, the optical path folding member is disposed opposite to the imaging element with respect to the attachment/detachment portion, the direction of a reflecting surface of the optical path folding member is set such that the optical axis of the folded optical path is parallel to the optical axis of the conversion optical system, and another optical system is disposed on the folded optical path.

The another optical system includes another optical path folding member and an eyepiece lens, and the another optical path folding member is disposed on the light incident side of the eyepiece lens so as to reflect light exiting from the eyepiece lens in the direction away from the optical axis of the conversion optical system.

The another optical path folding member includes an image-forming optical system and an eyepiece lens, the image-forming optical path is designed to form an intermediate image, and the eyepiece lens is designed to have its optical axis parallel to the optical axis of the conversion optical system.

An imaging device according to the present invention includes the imaging body of the second aspect of the present invention and the optical unit.

DETAILED DESCRIPTION OF PREFERRED EMBODIMENT

Figure 1:
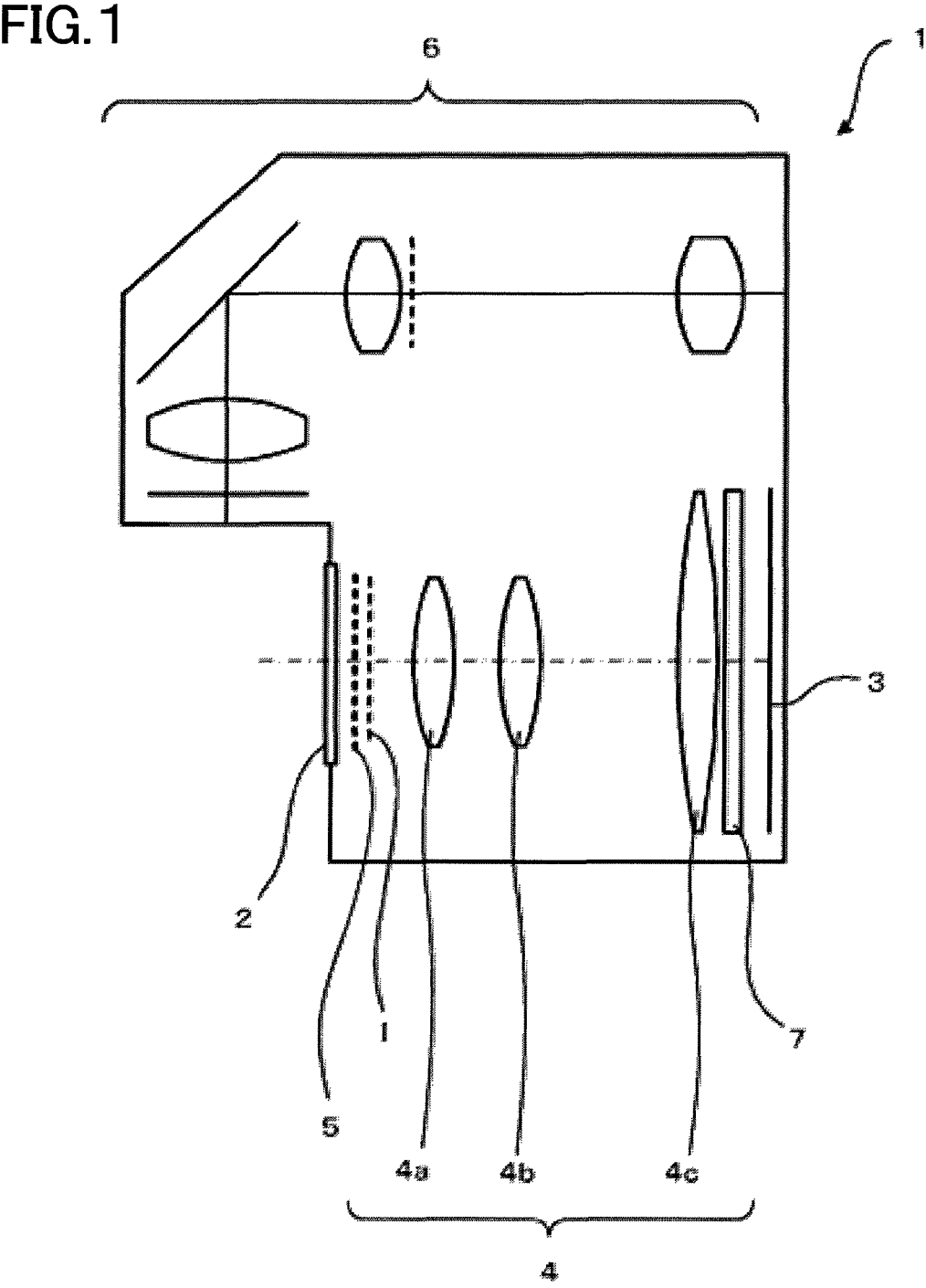
FIG. 1 is a view illustrating an imaging body according to a first embodiment of the present invention.

Embodiments of the present invention will be described. FIG. 1 illustrates an imaging body according to a first embodiment of the present invention. As illustrated in FIG. 1, an imaging body 1 includes an attachment/detachment portion 2, an imaging element 3, a conversion optical system 4, a shutter 5, and a finder optical system 6. The attachment/detachment portion 2 is, e.g., a bayonet ring. An imaging optical system can detachably be attached to the imaging body through the attachment/detachment portion 2. Further, a filter 7 is disposed in front of the imaging element 3.

The conversion optical system 4 is disposed between the attachment/detachment portion 2 and the imaging element 3. An intermediate image I is formed between the attachment/detachment portion 2 and the imaging element 3 by the conversion optical system 4. A shutter 5 is disposed near the intermediate image I. In the present embodiment, the shutter 5 is disposed between the attachment/detachment portion 2 and the intermediate image I. Alternatively, the shutter 5 may be disposed between the intermediate image I and the imaging element 3.

The conversion optical system 4 is constituted by front side lens systems 4a, 4b and a rear side lens system 4c. The front side lens systems 4a and 4b have a positive refractive power as a whole. The rear side lens system 4c has a positive refractive power as a whole.

The front side lens systems 4a and 4b have a positive refractive power lens 4a disposed near the intermediate image I and another positive refractive power lens 4b. The lens 4a, which is disposed near the intermediate image I, functions as a field lens.

Although the front side lens system 4a, front side lens system 4b, and the rear side lens system 4c are each constituted by one lens in FIG. 1, they each may be constituted by a plurality of lenses.

The conversion optical system 4 is an optical system that forms an intermediate image (primary image). Thus, even when a subject image is enlarged, an aberration-free image can be obtained.

As described above, the imaging body 1 of the present embodiment includes the conversion optical system 4 inside thereof. Thus, a large subject image can be formed on the entire light receiving section by the conversion optical system 4. As a result, an element having a large light receiving section can be used as the imaging element 3. Even in an imaging optical system for an imaging device having a small light receiving section, a large subject image can be formed by means of the conversion optical system 4. This provides an advantage that an existing imaging optical system can be used.

Further, in the imaging body 1 according to the present embodiment, the shutter 5 is disposed near the intermediate image I (primary image). The intermediate image I is smaller in size than the final image (on the light receiving section of the imaging element 3). Thus, the size of the shutter 5 can be reduced as compared to a case where the shutter 5 is disposed near the imaging element 3.

Further, in the present embodiment, the imaging body 1 does not include an optical path division means inside thereof, which allows achievement of a reduction in the thickness of the imaging body 1.

Figure 2:
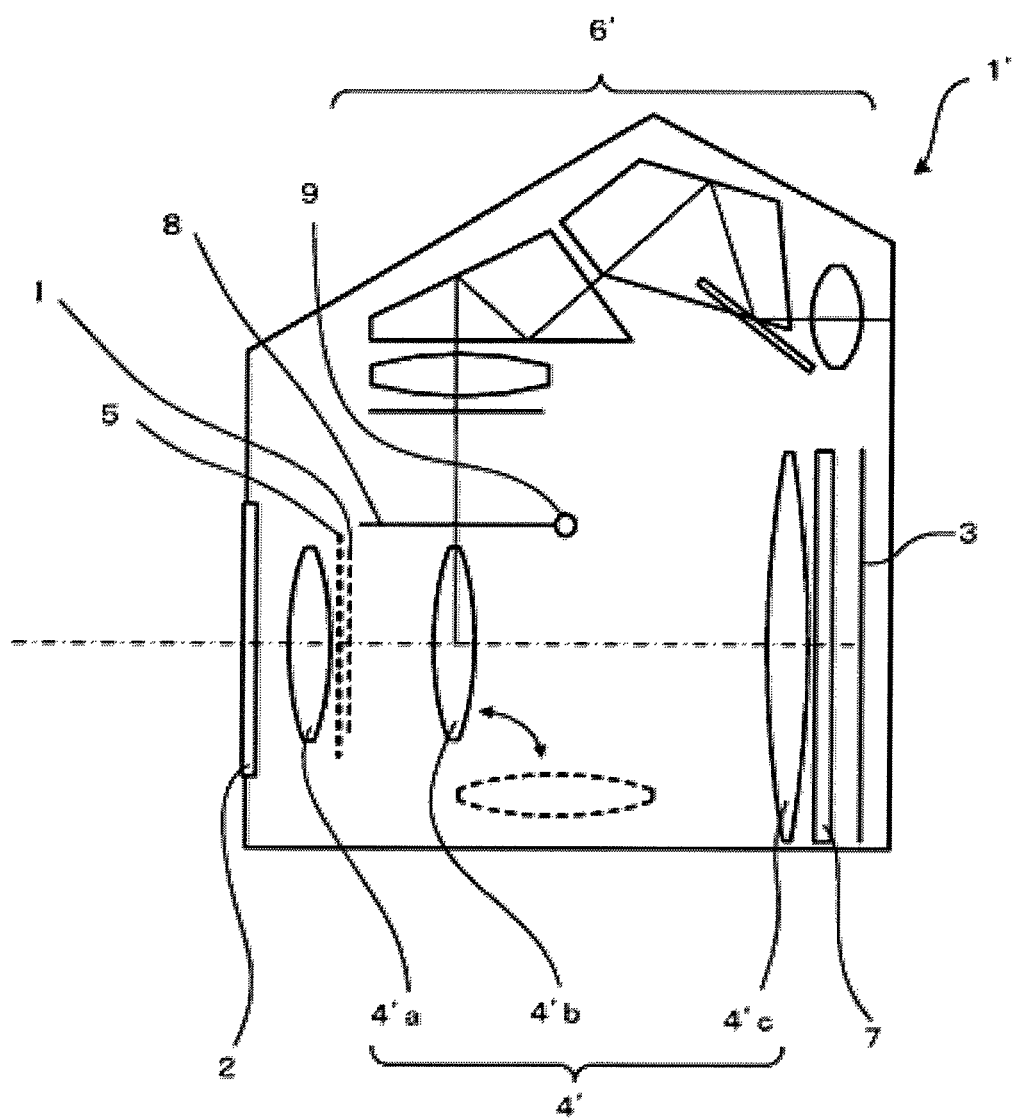
FIG. 2 is a view illustrating an imaging body according to a second embodiment of the present invention.

An imaging body according to a second embodiment is illustrated in FIG. 2. An imaging body 1' according to the present embodiment includes an optical path division means 8 and a moving mechanism 9 inside thereof.

The optical path division means 8 is. e.g., a mirror (quick return mirror). The mirror can be moved between first and second positions by the moving mechanism 9. The first position is a position overlapped with lens 4'b. The first position is located between the attachment/detachment portion 2 and the imaging element 3. The second position is indicated by a solid line. The second position is a position near a finder optical system 6' which is obtained by rotating the optical path division means 8 by 45 degrees.

In the present embodiment, the optical path division means 8 is moved between the first and second positions. The lens 4'b is also moved to the first position. Thus, when the optical path division means 8 is moved to the first position, the lens 4'b is moved to a position indicated by a broken line by a moving mechanism (not shown). This avoids a collision between the optical path division means 8 and the lens 4'b.

The conversion optical system 4' is disposed between the attachment/detachment portion 2 and the imaging element 3. An intermediate image I is formed between the attachment/detachment portion 2 and the imaging element 3 by the conversion optical system 4'. The shutter 5 is disposed near the intermediate image I. In the present embodiment, the shutter 5 is disposed between the attachment/detachment portion 2 and the intermediate image I. Alternatively, the shutter 5 may be disposed between the intermediate image I and the imaging element 3.

As described above, the imaging body 1' of the present embodiment includes the conversion optical system 4' inside thereof. Thus, a large subject image can be formed on the entire light receiving section by the conversion optical system 4'. As a result, an element having a large light receiving section can be used as the imaging element 3. Even in an imaging optical system for an imaging device having a small light receiving section, a large subject image can be formed by means of the conversion optical system 4'. This provides an advantage that an existing imaging optical system can be used.

Further, in the imaging body 1' according to the present embodiment, the shutter 5 is disposed near the intermediate image I (primary image). The intermediate image I is smaller in size than the final image (on the light receiving section of the imaging element 3). Thus, the size of the shutter 5 can be reduced as compared to a case where the shutter 5 is disposed near the imaging element 3.

It appears in FIG. 2 that an area of the portion where the optical path division means 8 crosses the optical path is small in a state where the optical path division means 8 is located at the first position. Actually, however, the optical path division means 8 has an area sufficient to reflect all light beams even in this state.

Figure 3:
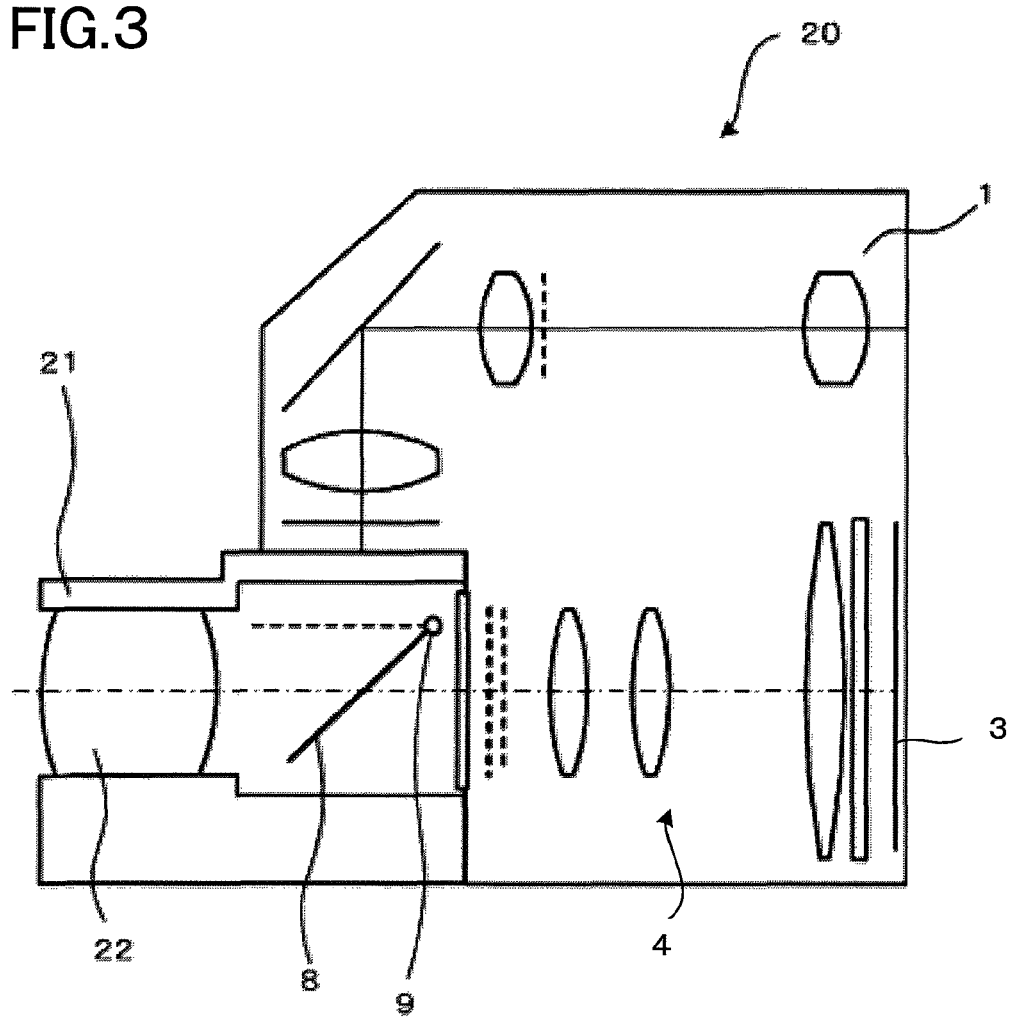
FIG. 3 is a view illustrating an imaging device according to a third embodiment of the present invention.

Next, as a third embodiment, an imaging device is illustrated in FIG. 3. An imaging device 20 according to the present embodiment includes the imaging body 1 and an optical unit 21. As illustrated in FIG. 3, the optical unit 21 includes an imaging optical system 22, the optical path division means 8, and the moving mechanism 9. The optical unit 21 is connected to the imaging body 1 through the attachment/detachment portion 2 and thereby a subject image is formed on the imaging element 3 through the imaging optical system 22 and the conversion optical system 4.

Figure 4:
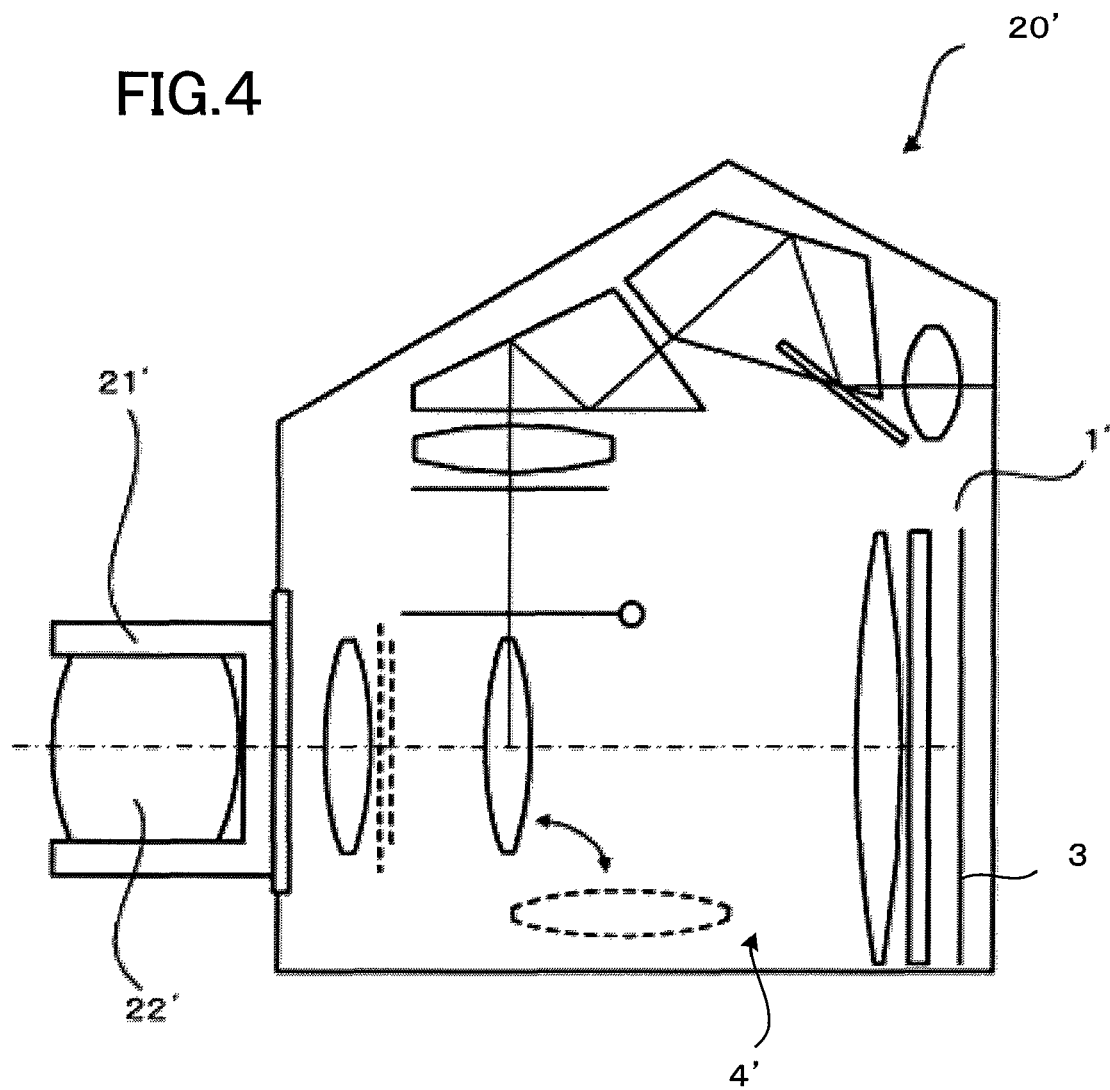
FIG. 4 is a view illustrating an imaging device according to a fourth embodiment of the present invention.

Another imaging device is illustrated in FIG. 4 as a fourth embodiment. An imaging device 20' according to the present embodiment includes the imaging body 1' and an optical unit 21'. As illustrated in FIG. 4, the optical init 21' includes an imaging optical system 22'. The optical unit 21' is connected to the imaging body 1' through the attachment/detachment portion 2 and thereby a subject image is formed on the imaging element 3 through the imaging optical system 22' and the conversion optical system 4'.

Figure 5:
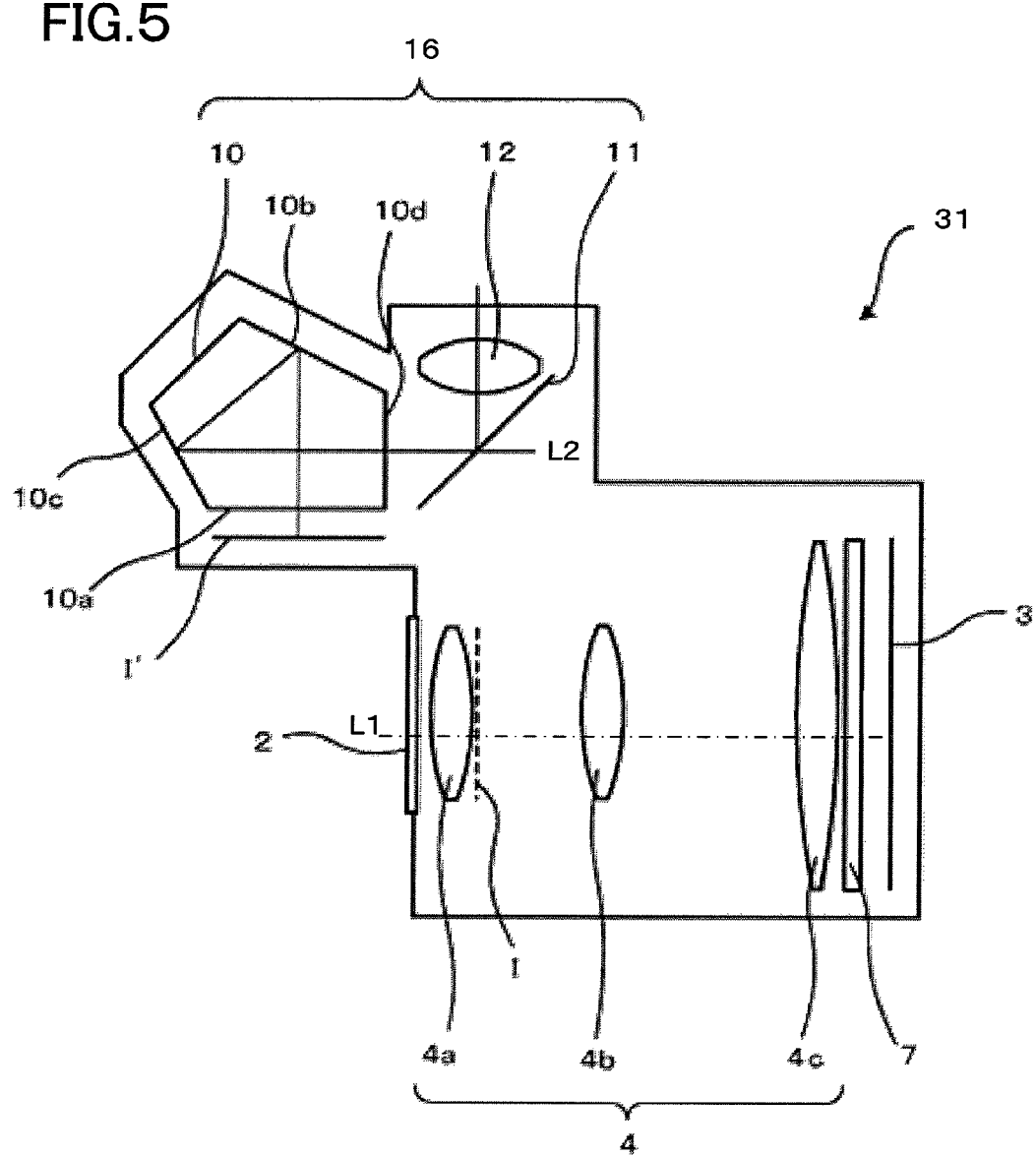
FIG. 5 is a view illustrating an imaging body according to a fifth embodiment of the present invention.

Other embodiments of the present invention will be described below. An imaging body according to a fifth embodiment is illustrated in FIG. 5. As illustrated in FIG. 5, the imaging body 31 includes the attachment/detachment portion 2, the imaging element 3, the conversion optical system 4, and a finder optical system 16. The attachment/detachment portion 2 is, e.g., a bayonet ring. An optical unit can detachably be attached to the imaging body through the attachment/detachment portion 2. Further, in the present embodiment, the filter 7 is disposed in front of the imaging element 3.

The conversion optical system 4 is disposed between the attachment/detachment portion 2 and the imaging element 3. An intermediate image I is formed between the attachment/detachment portion 2 and the imaging element 3 by the conversion optical system 4.

The conversion optical system 4 is constituted by the front side lens systems 4a, 4b and rear side lens system 4c. The front side lens systems 4a and 4b have a positive refractive power as a whole. The rear side lens system 4c has a positive refractive power as a whole.

The front side lens systems 4a and 4b have a positive refractive power lens 4a disposed near the intermediate image I and another positive refractive power lens 4b. The lens 4a, which is disposed near the intermediate image I, functions as a field lens.

Although the front side lens system 4a, front side lens system 4b, and rear side lens system 4c are each constituted by one lens in FIG. 5, they each may be constituted by a plurality of lenses.

The conversion optical system 4 is an optical system that forms an intermediate image. Thus, even when a subject image is enlarged, an aberration-free image can be obtained.

The finder optical system 16 includes an optical path folding member 10. In the present embodiment, the optical path folding member 10 is a prism. Alternatively, the optical path folding member 10 is a mirror. The direction of a reflecting surface of the optical path folding member 10 is set such that an optical axis L2 of the folded optical path is parallel to an optical axis L1 of the conversion optical system 4. However, the optical paths L1 and L2 need not be completely parallel to each other. On the folded optical path, an optical system other than the finder optical system 16 is disposed.

An imaging body 31 of the present embodiment does not include the optical path division means inside thereof. The optical path division means is provided in an optical unit to be described later. Thus, when the optical unit is attached to the imaging body 31, the optical path division means is located on the front side (opposite side of the imaging element 3 with respect to the attachment/detachment portion 2) relative to the attachment/detachment portion 2. Thus, the optical path folding member 10 is disposed opposite to the imaging element 3 with respect to the attachment/detachment portion 2. With this arrangement, light reflected by the optical path division means, i.e., light from a subject can be guided to the finder optical system 16.

The finder optical system 16 includes two types: one that does not form an intermediate image (secondary intermediate image) therein; and one that forms the secondary intermediate image therein. In the present embodiment, the finder optical system 16 is an optical system that does not form the second intermediate image. Thus, the finder optical system 16 includes, as another optical system, another optical path folding member 11 and an eyepiece lens 12.

Light from a subject travels to the finder optical system 16 through the optical unit and forms an intermediate image (primary intermediate image I'). The light then enters the optical path folding member 10. The optical path folding member 10 is a pentaprism. The light passing through an incident surface 10a of the pentaprism is reflected by a first reflecting surface 10b and travels to a second reflecting surface 10c. The direction of second reflecting surface 10c is set such that the optical axis L2 of the folded optical path is parallel to the optical axis L1 of the conversion optical system 4. Accordingly, the light (on-axis main beam) reflected by the second reflecting surface 10c becomes parallel to the optical axis L1 of the conversion optical system 4, and the resultant light passes through an exit surface 10d.

The light exiting from the exit surface 10d then enters the another optical path folding member 11. The another optical path folding member 11 is a mirror. The another optical path folding member 11 is disposed on the light incident side of the eyepiece lens 12. The light entering the another optical path folding member 11 is reflected to the eyepiece lens 12. The eyepiece lens 12 is disposed opposite to the conversion optical system 4 with respect to the optical axis L2. That is, the another optical path folding member 11 (reflecting surface thereof) is disposed so as to reflect the light exiting from the eyepiece lens 12 in the direction away from the optical axis L1 of the conversion optical system 4.

As described above, the imaging body 31 of the present embodiment includes the conversion optical system 4 inside thereof. Thus, a large subject image can be formed on the entire light receiving section by the conversion optical system 4. As a result, an element having a large light receiving section can be used as the imaging element 3. Even in an imaging optical system for an imaging device having a small light receiving section, a large subject image can be formed by means of the conversion optical system 4. This provides an advantage that an existing imaging optical system can be used. Further, the imaging body 31 of the present embodiment does not include the optical path division means inside thereof, which allows achievement of a reduction in the thickness of the imaging body 1.

In the present embodiment, the conversion optical system 4 is provided in the imaging body 31, so that the thickness increases in the optical axis direction. However, the finder optical system 16 in the present embodiment is designed to reflect the light exiting from the eyepiece lens in the direction away from the optical axis of the conversion optical system, so that the finder optical system 16 providing easy observation can be obtained.

Further, the finder optical system 16 of the present embodiment does not form an intermediate image (secondary intermediate image), so that the finder optical system 16 is constituted by a small number of parts (two optical path folding members 10, 11 and eyepiece lens 12), thereby simplifying the configuration of the finder optical system 16.

Further, in the finder optical system 16 of the present embodiment, the distance between the primary intermediate image I' and eye point is smaller than in the finder optical system that forms the intermediate image (secondary intermediate image). On the other hand, however, the light exiting from the eyepiece lens 12 is guided in the direction away from the optical axis L1 of the conversion optical system 4, allowing a photographer to confirm a subject from above the imaging body 31 through a finder. Thus, the small distance between the primary intermediate image I' and eye point does not adversely affect the confirmation of a subject.

Figure 6:
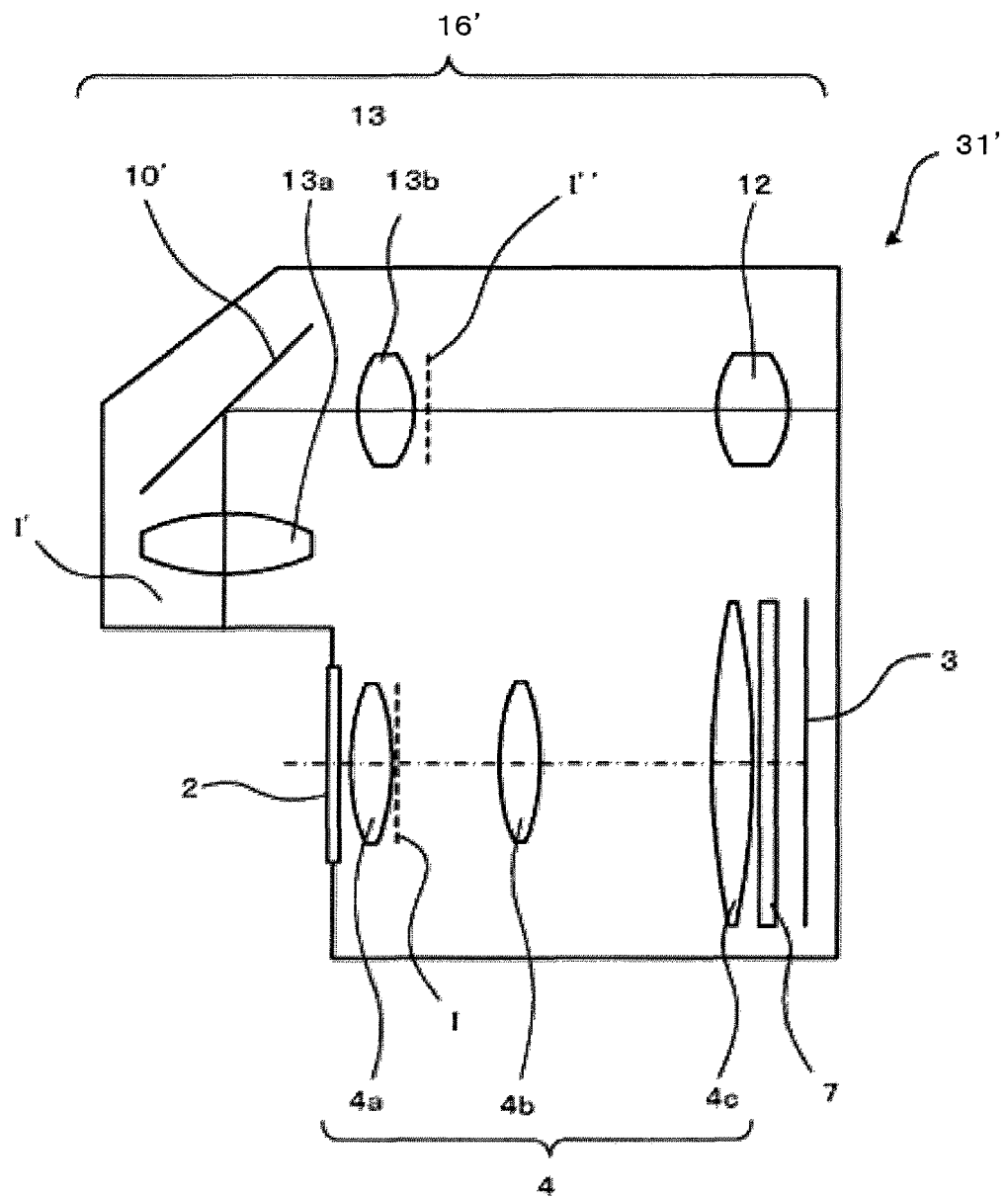
FIG. 6 is a view illustrating an imaging body according to a sixth embodiment of the present invention.

A sixth embodiment of the present invention will be described. An imaging body according to the sixth embodiment is illustrated in FIG. 6. In FIG. 6, the same reference numerals as those in FIG. 5 denote the same parts as those in FIG. 1, and the descriptions thereof will be omitted here. An imaging body 31' of the present embodiment includes a finder optical system 16'.

The finder optical system 16' in the present embodiment forms a secondary intermediate image. Thus, the finder optical system 16' includes, as another optical system, an image-forming optical system 13 and the eyepiece lens 12. The image-forming optical system 13 is constituted by a first lens 13a and a second lens 13b.

Light from a subject travels to the finder optical system 16' through the optical unit and forms a primary intermediate image I'. The first lens 13a is disposed near the primary intermediate image I'. The light passing through the first lens 13a enters an optical path folding member 10'. The optical path folding member 10' is a mirror. The light that has entered the optical path folding member 10' is reflected by the reflecting surface of the optical path folding member 10'.

The direction of the reflecting surface of the optical path folding member 10' is set such that an optical axis L2 of the folded optical path is parallel to an optical axis L1 of the conversion optical system 4. Accordingly, the light (on-axis main beam) reflected by the optical path folding member 10' becomes parallel to the optical axis L1 of the conversion optical system 4, and the resultant light travels to the second lens 13b. The light then enters the second lens 13b and forms a secondary intermediate image I". The light from the secondary intermediate image I" enters the eyepiece lens 12. The eyepiece lens 12 is designed to have its optical axis parallel to the optical axis L1 of the conversion optical system 4. On the folded optical path, the above-mentioned another optical system is disposed.

Since the secondary intermediate image I" is formed in the finder optical system 16' as described above, the distance between the primary intermediate image I' and eye point is larger than in the finder optical system 16' that forms the secondary intermediate image I". As described above, in the present embodiment, the conversion optical system 4 is provided in the imaging body 31', so that the thickness increases in the optical axis direction. However, the finder optical system 16' in the present embodiment forms the secondary intermediate image I", so that the eyepiece lens 12 can be located near the rear surface of the imaging body 31', so that the finder optical system 16' providing easy observation can be obtained. Further, the optical path folding member 10', the second lens 13*b*, and eyepiece lens 12 can be arranged in series, simplifying the optical path of the finder optical system 16'.

Figure 7:
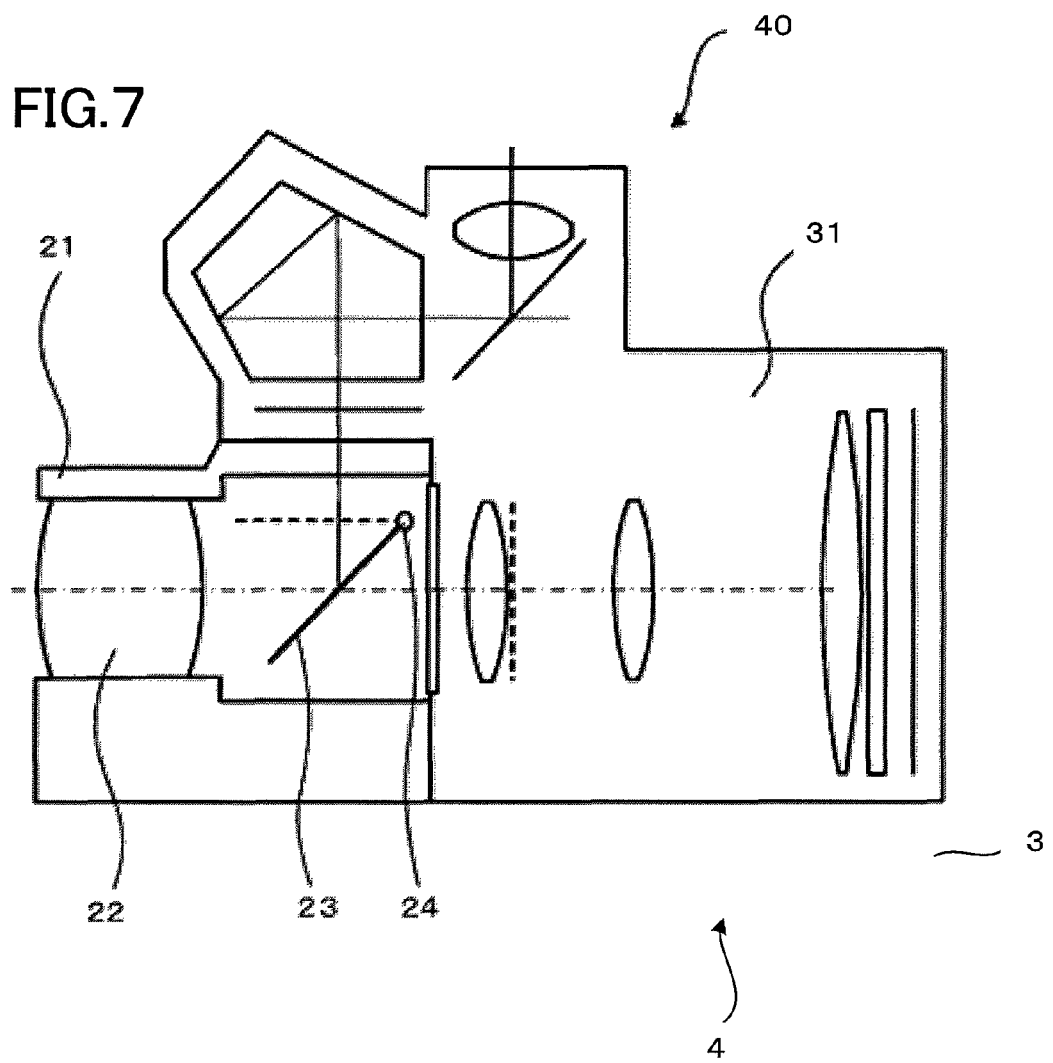
FIG. 7 is a view illustrating an imaging device according to a seventh embodiment of the present invention.

Next, as a seventh embodiment, an imaging device is illustrated in FIG. 7. An imaging device 40 according to the present embodiment includes the imaging body 31 and optical unit 21. As illustrated in FIG. 7, the optical unit 21 includes the imaging optical system 22, an optical path division means 23, and a driving mechanism 24. The optical unit 21 is connected to the imaging body 31 through the attachment/detachment portion 2 and thereby a subject image is formed on the imaging element 3 through the imaging optical system 22 and the conversion optical system 4.

Figure 8:
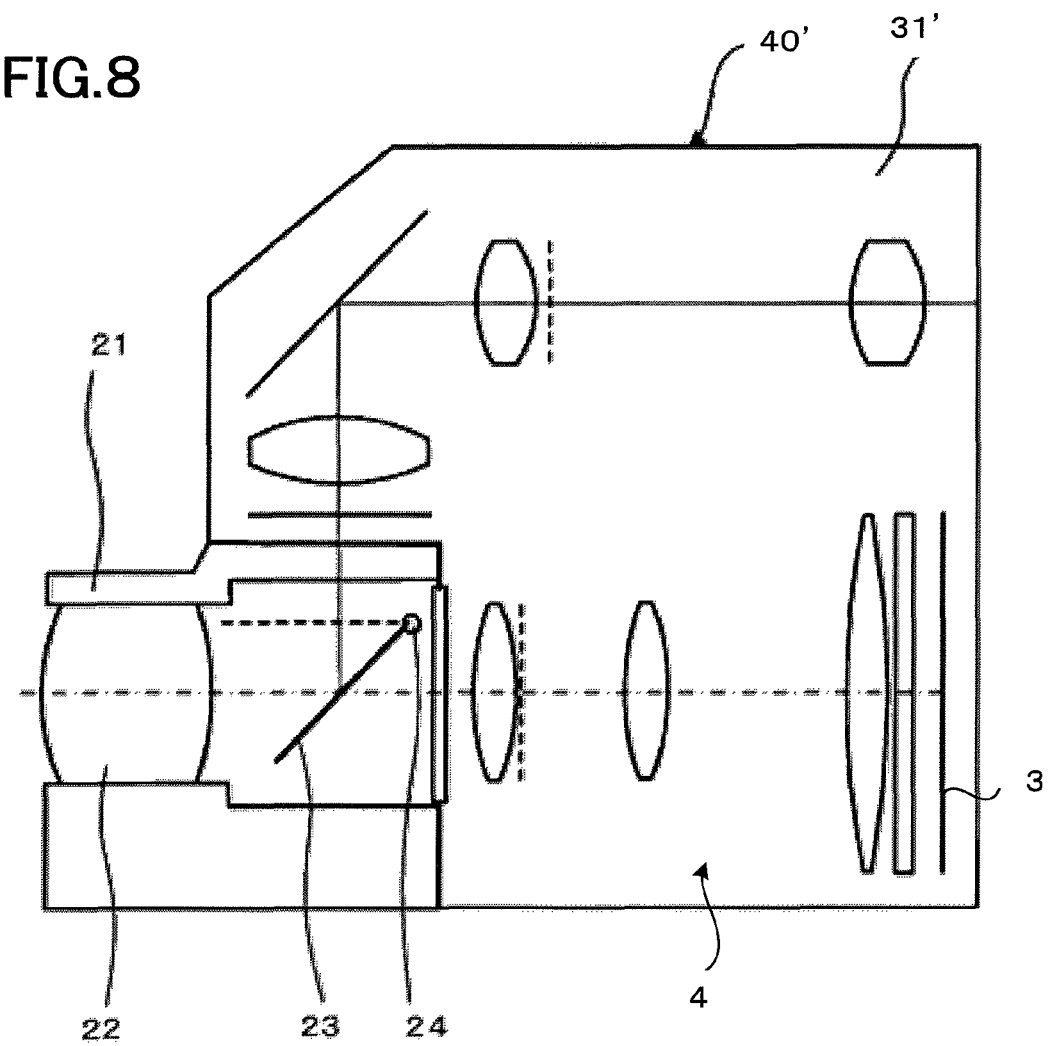
FIG. 8 is a view illustrating an imaging body according to an eighth embodiment of the present invention.

As an eighth embodiment, another imaging device is illustrated in FIG. 8. An imaging device 40' according to the present embodiment includes the imaging body 31' and the optical unit 21.

According to the above embodiments, an imaging body capable of using imaging elements different in the size of a light receiving section and capable of reducing the size of a shutter can be obtained while its thin-shape maintained. Further, a finder optical system providing easy observation can be obtained. In addition, an imaging device including this imaging body can be obtained.

The present invention may be variously modified without departing the scope thereof.

What is claimed is:

1. An imaging body comprising:
   an attachment/detachment portion to which an imaging optical system is detachably attached;
   an imaging element; and
   an conversion optical system, wherein
   the conversion optical system is constituted by a front side lens system and a rear side lens system,
   the conversion optical system forms an intermediate image between the attachment/detachment portion and imaging element, and
   a shutter is provided near the intermediate image.
2. The imaging body according to claim 1, wherein
   the shutter is disposed between the attachment/detachment portion and intermediate image.
3. The imaging body according to claim 1, wherein
   the shutter is disposed between the intermediate image and imaging element.
4. An imaging device comprising the imaging body as claimed in claim 1 and the imaging optical system.

* * * * *